Fig. 4.

July 10, 1945.  W. McLUCAS  2,380,058
NEEDLE SCOURING AND POLISHING MACHINE
Filed Sept. 19, 1944   10 Sheets-Sheet 4

Inventor
William McLucas
By William P. Stewart
Attorney

July 10, 1945.  W. McLUCAS  2,380,058
NEEDLE SCOURING AND POLISHING MACHINE
Filed Sept. 19, 1944    10 Sheets-Sheet 5

Inventor
William McLucas
By
William P. Stewart
Attorney

July 10, 1945.　　　　W. McLUCAS　　　　2,380,058
NEEDLE SCOURING AND POLISHING MACHINE
Filed Sept. 19, 1944　　　10 Sheets-Sheet 6

July 10, 1945.  W. McLUCAS  2,380,058
NEEDLE SCOURING AND POLISHING MACHINE
Filed Sept. 19, 1944  10 Sheets-Sheet 9

Fig. 20.

Inventor
William McLucas
By
William P. Stewart
Attorney

Fig. 25.

Patented July 10, 1945

2,380,058

UNITED STATES PATENT OFFICE

2,380,058

NEEDLE SCOURING AND POLISHING MACHINE

William McLucas, Glasgow, Scotland, assignor to The Singer Manufacturing Company, Elizabeth, N. J., a corporation of New Jersey Application September 19, 1944, Serial No. 554,849
In Great Britain September 24, 1943

8 Claims. (Cl. 51—38)

The subject of this invention is a semi-automatic power-driven machine for use in scouring and polishing sewing machine and like needles in the course of manufacture of such needles.

A machine according to the invention comprises a pair of quick-pitch power-driven rotary conveyor screws journalled in the frame of the machine.

At spaced points along the length of the machine there are provided needle-treating heads or stations each including an arm which carries on its free end a power-driven rotary scouring or polishing brush which, in use, simultaneously rotates about a horizontal axis, reciprocates axially and also reciprocates transversely of its axis in a horizontal plane. The arm is swingable about a horizontal axis so that the brush may be lowered from operative position, and raised into operative position. When in operative position, the top of the brush is located at about the level of the conveyor screws.

Disposed along the front of the machine is a horizontal guide rail located about level with the screws and provided at spaced points along its length with gaps or interruptions.

Disposed along the rear of the machine is a power-driven endless conveyor belt or the equivalent which extends from one end to the other end of the machine.

The needles to be scoured or polished are loaded by an operative into needle-carrying members in the form of tongs each of which is adapted to hold between its jaws a plurality of needles closely spaced apart in a row. The tongs, to be loaded with needles are taken one at a time by the operative from the conveyor belt.

As will be understood, the jaws of a pair of tongs may be caused to grip either the shank portions or the blade or point-portions of the needles, the protruding portions of the needles being these portions which are to be subjected to scouring or polishing.

After loading, each pair of tongs is placed transversely upon the conveyor screws, with the jaw end of the tongs resting upon the guide rail at the front of the machine. The conveyor screws rotate intermittently so that the tongs are conveyed stepwise along the length of the machine, the periods of operation of the screws alternating with dwell periods during which each of the pairs of tongs upon the screws is located at a needle-treating head so that the needles in the tongs are scoured or polished by the action of the respective brush, which latter is caused to rise into operative position so as to act on the undersides of the needles presented by the tongs. In travelling from one head to the succeeding head each pair of tongs turns through half a revolution, so that what were previously the uppersides of the needles are the undersides for the succeeding brush. Thus, both sides of the needles are presented in turn to the brushes in the passage of the tongs along the machine. This rotary movement of the tongs is caused by the frictional action on the tongs of the conveyor screws, and is permitted when the jaws of the tongs come into register with a gap in the guide rail. After each scouring or polishing operation the arms and the brushes descend out of the way to permit the tongs to be traversed along by the screws into register with the succeeding heads, whereupon the brushes are again raised into operative position for a successive scouring or polishing operation.

At the delivery end of the machine there may be provided an oscillatory transfer device devised to lift the tongs one at a time from the conveyor screws and to deposit them upon the conveyor belt, which latter conveys the tongs towards the feed end of the machine. In the return passage of the tongs to the feed end of the machine the treated needles are removed by an operative from the tongs and the tongs reloaded with a fresh supply of needles.

While the tongs on the machine are located at the scouring or polishing heads the tongs are temporarily clamped in position by overhead power-operated swinging clamps which are operated to clamp and to release the tongs in timed relation with the operation of the conveyor screws.

The machine may be divided longitudinally into two sections adapted to scour or polish the blade or point portions and the shank portions, respectively, of the needles, or vice-versa. For example, at the feed end of the first section the shank portions of the needles may be gripped in the tongs so that the blade or point portions of the needles are treated in the first section of the machine. At the delivery end of the first section an operative loads the needles reversely into another pair of tongs and places these latter tongs on the conveyor screws at the feed end of the second section, so that the shank portions of the needles are treated in the second section of the machine.

The first section of the machine may be provided with the following scouring or polishing brushes located one at each head, in sequence from the feed end, namely, first and second brushes of brass or other material, third and fourth brushes of copper or other material, and fifth and sixth brushes of hair or other material. The second section of the machine may be provided with first and second brushes of brass or other material, and with third and fourth brushes of hair or other material.

Certain or all of the brushes may be arranged to dip into baths containing abrasive, chalk, or other material.

An overhead power-driven rotary brush may be associated with each or with certain of the aforesaid brushes.

In practice, needles are treated in the machine three times, firstly, after hardening and tempering of the needles, i. e., scouring; secondly, after finish pointing, i. e., polishing; and, thirdly, after plating and final inspection, i. e., polishing.

Description will now be given of the construction and operation of a needle scouring and polishing machine according to the invention reference being made to the accompanying drawings in which the same reference characters indicate corresponding parts in the several figures.

Fig. 2 is a skeletonized plan view. Certain parts are omitted from these views for clearness, the figures being intended merely to convey a general idea of the arrangement of the machine; Fig. 14 is a face view of part of Fig. 13 later to be referred to; Fig. 21 is a side view and Fig. 22 an end view of the gripper elements of lifting means for lifting the tongs from the conveyor shafts at the delivery end of the machine; Fig. 23 is a side view and Fig. 24 an end view of similar gripper elements operating at the handle end of the tongs.

Referring to the drawings, the machine includes a pair of quick pitch power driven rotary conveyor screws 1, 2, disposed in parallelism in a substantially horizontal plane and journalled in the frame 3 of the machine.

At spaced points along the length of the machine there are provided needle-treating heads or stations, A, B, C, D, E, F, G, H, I, J, at each of which is located an arm 4 which carries on its free end a power-driven rotary scouring or polishing brush 5 which, in use, simultaneously rotates about a horizontal axis 6, reciprocates axially, and also reciprocates transversely of its axis in a horizontal plane. The arm 4 is swingable about a horizontal axis 7 so that the brush 5 may be lowered from operative position, and raised into operative position. When in operative position, the top of the brush 5 is located at about the level of the conveyor screws 1, 2, see Fig. 20.

Figures 8, 10, 11:
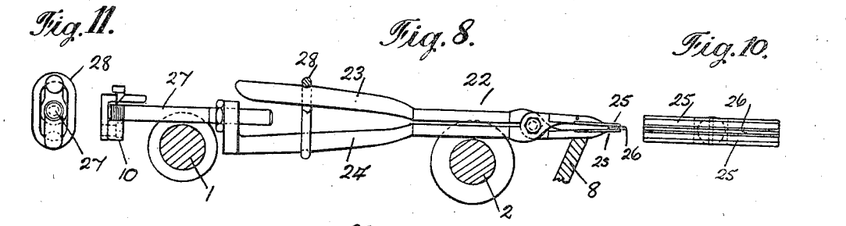
Fig. 8 is a sectional view drawn to a larger scale of tongs used to hold a number of needles to be treated in the machine.
Fig. 10 is an end view of the jaw plates of the tongs.
Fig. 11 is an end view of the handle end of the tongs.
Figure 13:
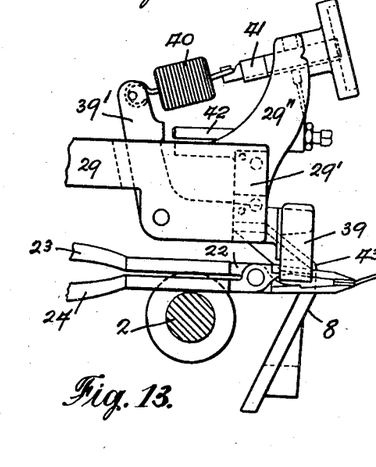
Fig. 13 is a fragmentary side view also drawn to a larger scale of a clamp for clamping the jaws of the tongs during the brushing operation.
Figure 14:
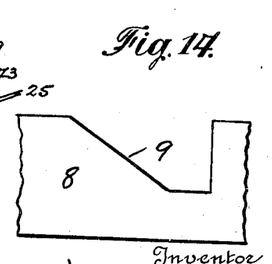

Disposed along the machine adjacent to the conveyor screw 2 is a horizontal guide rail 8 located in such position that its upper edge is slightly above the level of the root of the thread of the screw 2, see Figs. 8 and 13. The rail 8 is provided at spaced points along its length with gaps or interruptions 9, see Figs. 4 and 14. A further horizontal guide rail 10 is disposed along the machine adjacent to the conveyor screw 1. The guiding face of the rail 10 is slightly above the level of the root of the thread of the conveyor screw 1, see Fig. 8.

Figure 1:
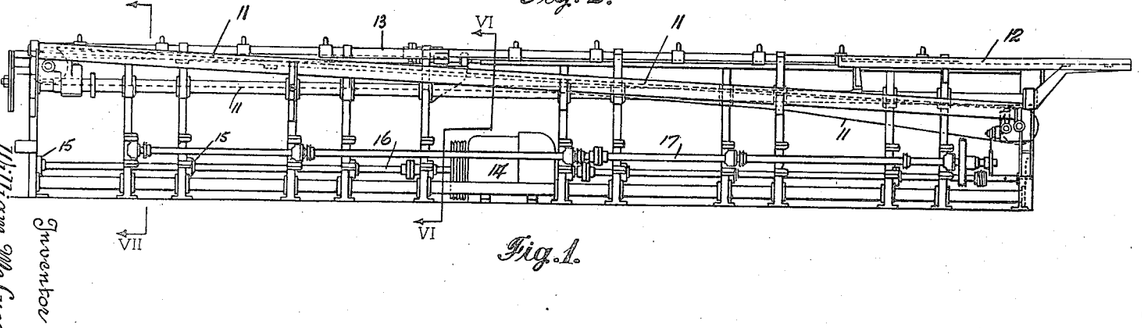
Fig. 1 is a side view from the operatives' side of the machine.
Figure 2:
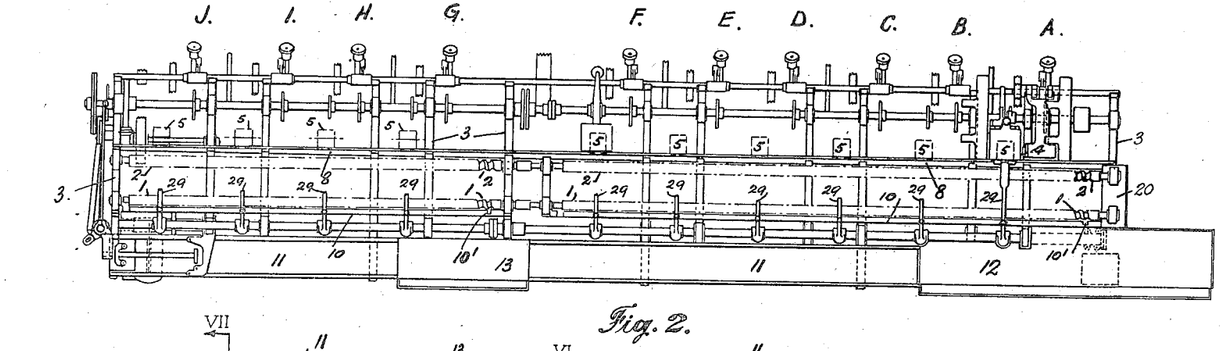
Figure 3:
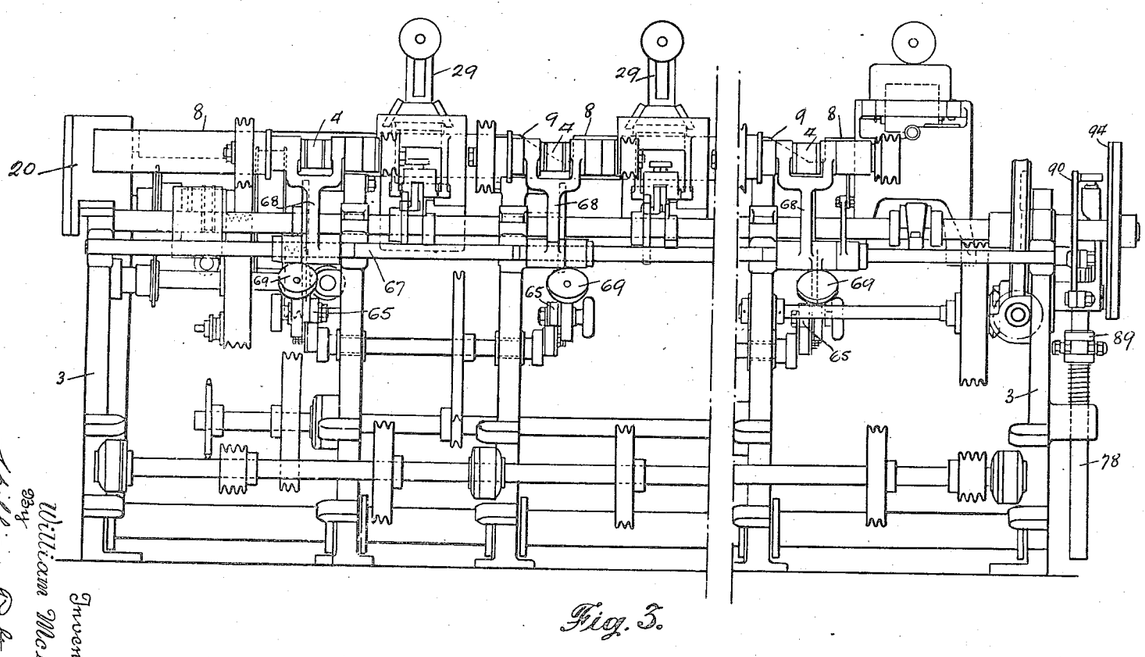
Fig. 3 is a side view, drawn to a larger scale, broken to shorten the figure and showing in greater detail the feeding end of the machine at the left-hand of the figure and the delivery end of the machine at the right-hand of the figure as viewed from a position opposite to that of Fig. 1.

Disposed along the rear of the machine is a power-driven endless conveyor belt 11 which extends from one end to the other end of the machine, see Figs. 1 and 2.

Located at the feeding end and at the rear of the machine is a table 12. A table 13 is located intermediate the table 12 and the delivery end of the machine.

Located at approximately mid-length of the frame 3 is an electric motor 14 which drives a main driving shaft 16 extending from end to end of the machine and journalled in bearings 15 in the end and intermediate frame members.

A shaft 17 journalled in bearings along the front of the machine and extending from end to end of the machine in parallelism with the shaft 16 is driven by means of belts and pulleys from the shaft 16 and in turn drives through other belts and pulleys other shafts for transmitting motion to the several operative parts of the machine.

Figure 5:
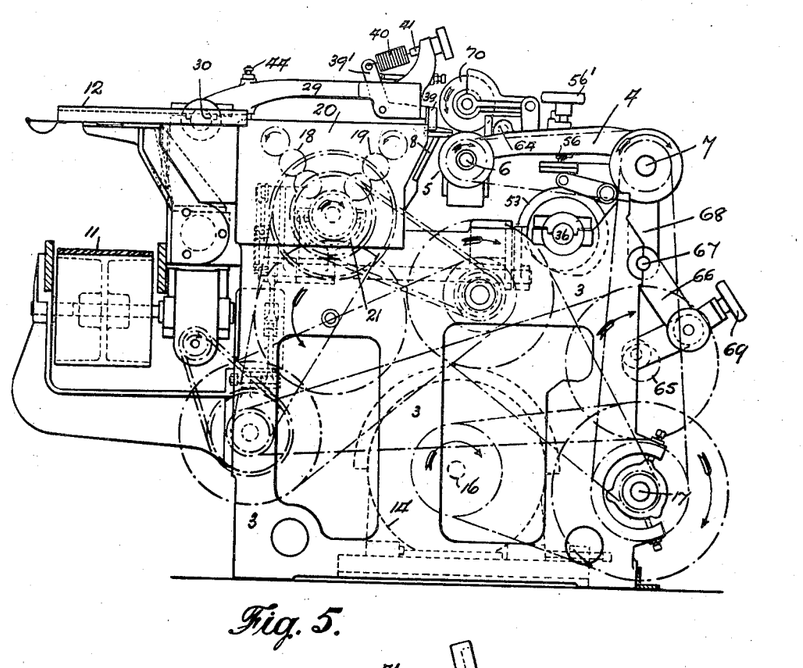
Fig. 5 is an end view of the machine from the feeding end.

The conveyor screws 1 and 2 are rotated intermittently through trains of gears 18, 19 in a gear box 20 controlled by a clutch 21 the driving element of which receives motion through belts and pulleys from the driving shaft 17, see Fig. 5.

Figure 12:
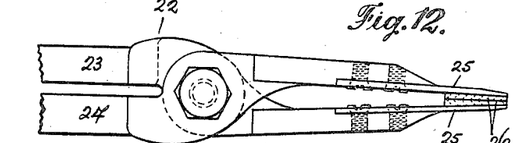
Fig. 12 is a fragmentary side view drawn to a larger scale of the jaw end of the tongs.

Referring to Figs. 8 to 12, which illustrate in detail tongs for holding needles to be treated in the machine, the tongs 22 comprise pivotally interconnected arms 23, 24 each provided at one end with a relatively wide jaw member furnished with a renewable hardened steel jaw plate 25 furnished at its gripping edge with a felt pad 26, see Fig. 12. The arm 24 of the tongs is provided with an adjustable extension or tail 27. A locking ring 28 encircles the arms 23, 24 and is adapted to be slid along said arms to lock or unlock the arms. As will later be described in connection with the operation of the machine, the tongs carrying a load of needles to be treated are placed on the screws 1 and 2, with the lowermost jaw member resting on the guide rail 8 and the extension 27 resting on the guide rail 10, the back of the rail 10 forming a stop for correct positioning of the tongs. The height of the rails 8 and 10 is such as to ensure that the tongs are supported just clear of the roots of the threads of the screws 1, 2, see Fig. 8. The rail 10 is formed with a gap 10' to permit entry of the extension 27 of the tongs.

The tongs are inserted in the machine with the arms 23 uppermost as shown in Fig. 8 for one pass through the machine; for the next pass through the machine the tongs are reversed to bring the arm 24 uppermost.

Figure 4:
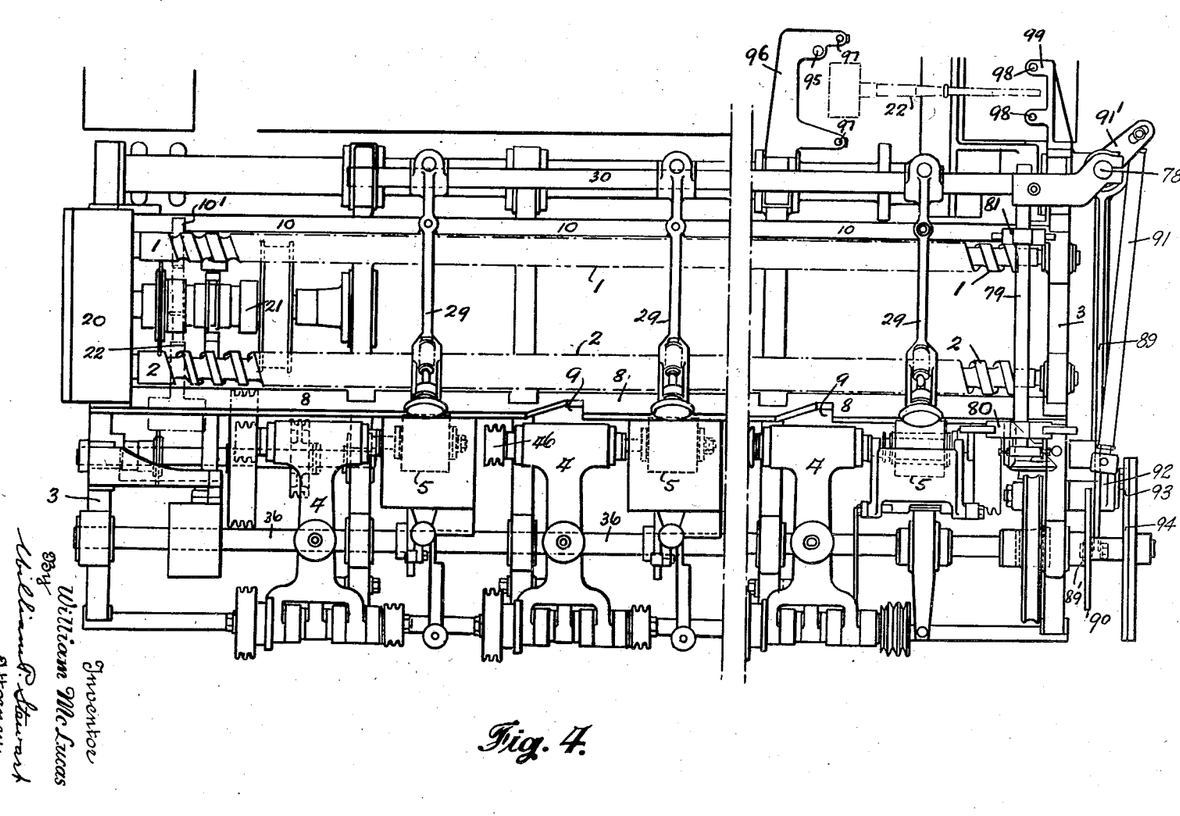
Fig. 4 is a plan of Fig. 3.
Figure 6:
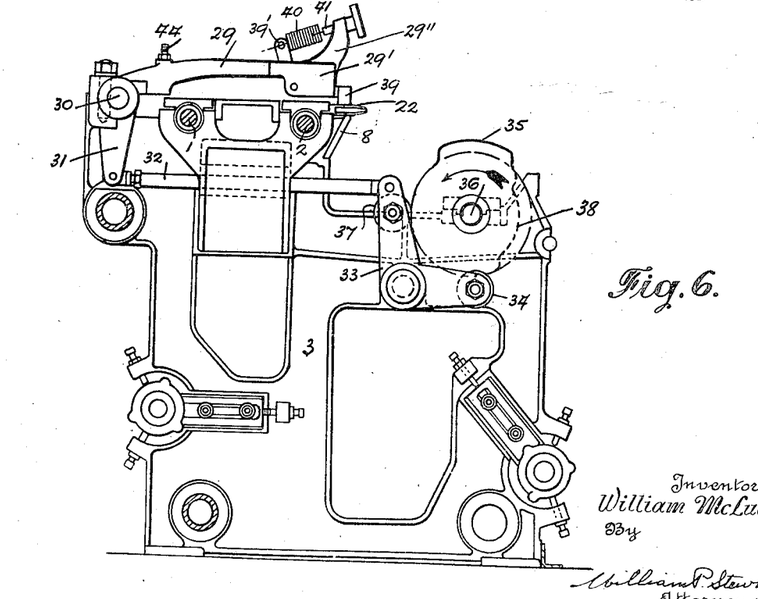
Fig. 6 is a sectional view through the machine, the plane of the section being through the line vi—vi of Fig. 1.
Figure 7:
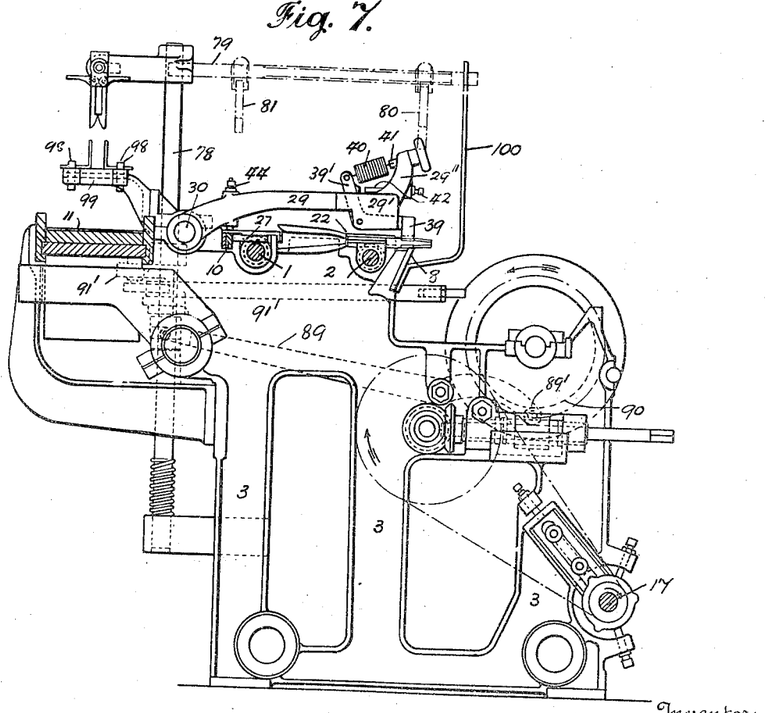
Fig. 7 is a sectional view through the machine, the plane of the section being through the line vii—vii of Fig. 1.

Description will now be given of clamping means for clamping the tongs in position during the brushing operation, reference being made in particular to Figs. 6, 13 and 20, although the clamping means is also illustrated in Figs. 4, 5 and 7. A clamp is located in position opposite to each brush and each clamp is similar in construction and operation. A clamp comprises an arm 29 mounted on a shaft 30 upon which is fixed an arm 31 which is connected at its free end to one end of a rod 32 the other end of which is connected to one arm of a bell-crank lever 33 pivoted on the frame 3. A roller 34 mounted on the other arm of the bell-crank lever 33 is located in the path of a cam 35 fixed on a shaft 36 journalled in the front of the frame 3 and driven by belt and pulleys from the shaft 7. A roller 37 mounted on the first-mentioned arm of the lever 33 is located in the path of movement of a cam 38 also mounted on the shaft 36. In the bifurcated end 29' of the arm 29 there is pivotally mounted a clamping pad 39. The pad 39 is influenced by a spring 40 secured at one end to an arm 39' of the pad 39 and at the opposite end to an adjustable bolt 41 in a bracket 29'' on the arm 29. Excess movement of the pad 39 is restricted by an adjustable stop 42 projecting through the bracket 29'', see Fig. 13. A stop plate 43 secured to the arm 29 serves to provide abutment for the jaw members of the tongs 22 to ensure correct positioning of the tongs 22 relatively to the respective brush 5. Located in the arm 29 adjacent to the pivot 30 is an adjustable spring-influenced member 44 having a wedge-shaped end, see Fig. 20.

The clamping arm 29 is lifted by the cam 35 acting on the roller 34 to rock the bell-crank lever 33 about its pivot, and through the rod 32 and arm 31 to turn the shaft 30 and lift the arm 29 to release the tongs. At the same time the roller 37 enters the cam groove in the cam 38. On the next movement of the cams the cam 38 engages the roller 37 and moves the clamp again into clamping position, see Fig. 6.

Figures 18, 18A:
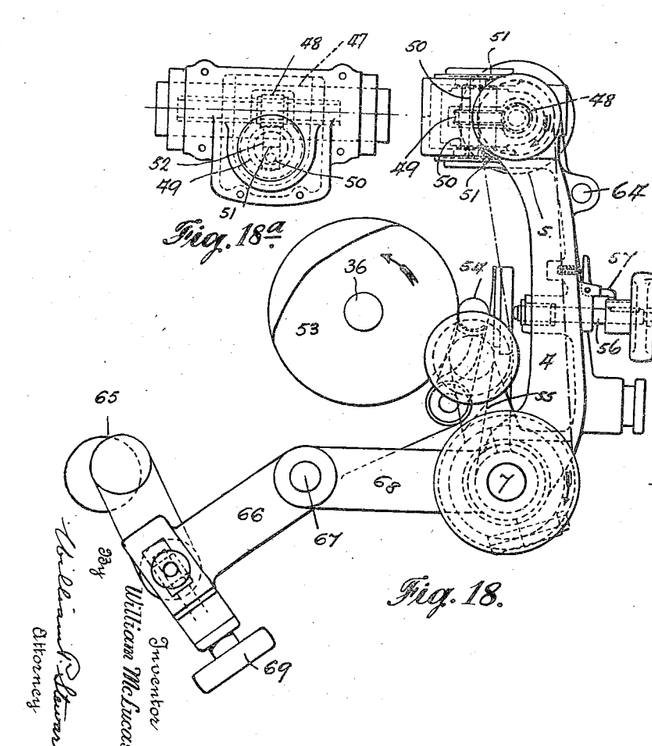
Fig. 18 is a side view and Fig. 19 an end view of a brush head.
Fig. 18a is an end view of Fig. 18.
Figure 19:
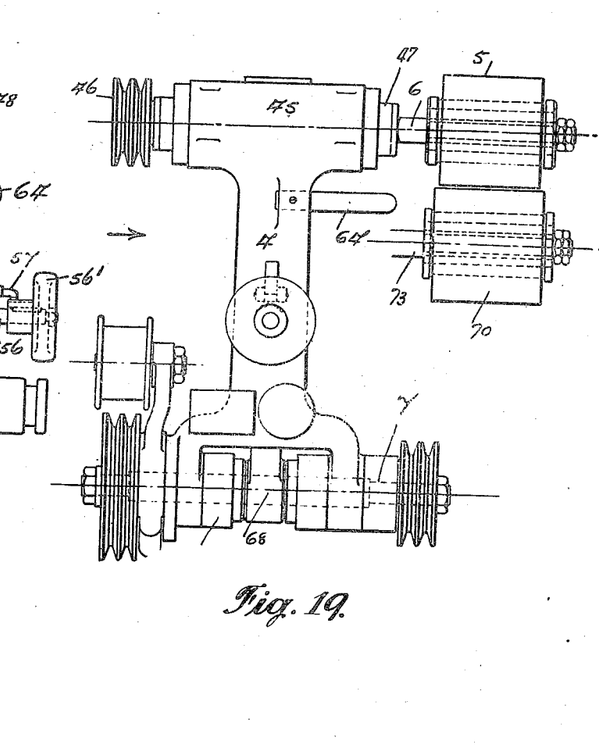

Description will now be given of a brush-carrying head and brush, with particular reference to Figs. 17, 18, 19 and 20. At each of the brushing stations A, B, C, D, and E, and G, H and I there is located a single brush as shown in Figs. 18 and 20. At the brushing stations F and J, there are located two brushes, arranged one above the other, see Fig. 5. The secondary brush is also shown in Fig. 19 but not in its correct working position.

The brushes at stations A, B, G and H are of brass; the brushes at the stations C, D and E are of copper; the brushes at the stations F, I and J are of tampico or hair.

The metallic brushes are supplied with abrasive or polishing material, while the tampico or hair brushes are supplied with powdered chalk. The abrasive or polishing material and the chalk may be applied to the brushes by an operative, or alternatively, the brushes may be arranged to dip into baths containing the abrasive, chalk, or other material.

The brush-carrying arm 4 pivotally mounted on the shaft 7 is formed at its free end with a bearing head 45 in which is rotatably and slidably mounted the brush-carrying shaft 6. A brush 5 is secured on one projecting end of the shaft 6 and a pulley 46 is secured on the opposite end of the shaft, the pulley 46 being driven by a belt and pulley from the shaft 17, see Fig. 5. The shaft 6 is journalled in bearings in a sleeve 41. In addition to transmitting rotation to the brush 5 the shaft 6 is adapted to reciprocate axially relatively to the head 45. The axial movement is obtained by means of a worm 48 fast on the shaft 6 and meshing with a worm wheel 49 mounted eccentrically on a pin 50 in the head 45. The pin 50 is journalled in slide blocks 51 adapted for sliding movement in grooves 52 formed in the bearing head 45, see Figs. 18 and 18a. As the shaft 6 revolves, the worm 48 rotates the worm wheel 49 and, owing to the eccentric mounting of the worm wheel 49, the worm 48 is caused to reciprocate axially carrying with it the shaft 6 and the brush 5, whereby the brush is moved across the needles.

Figure 20:
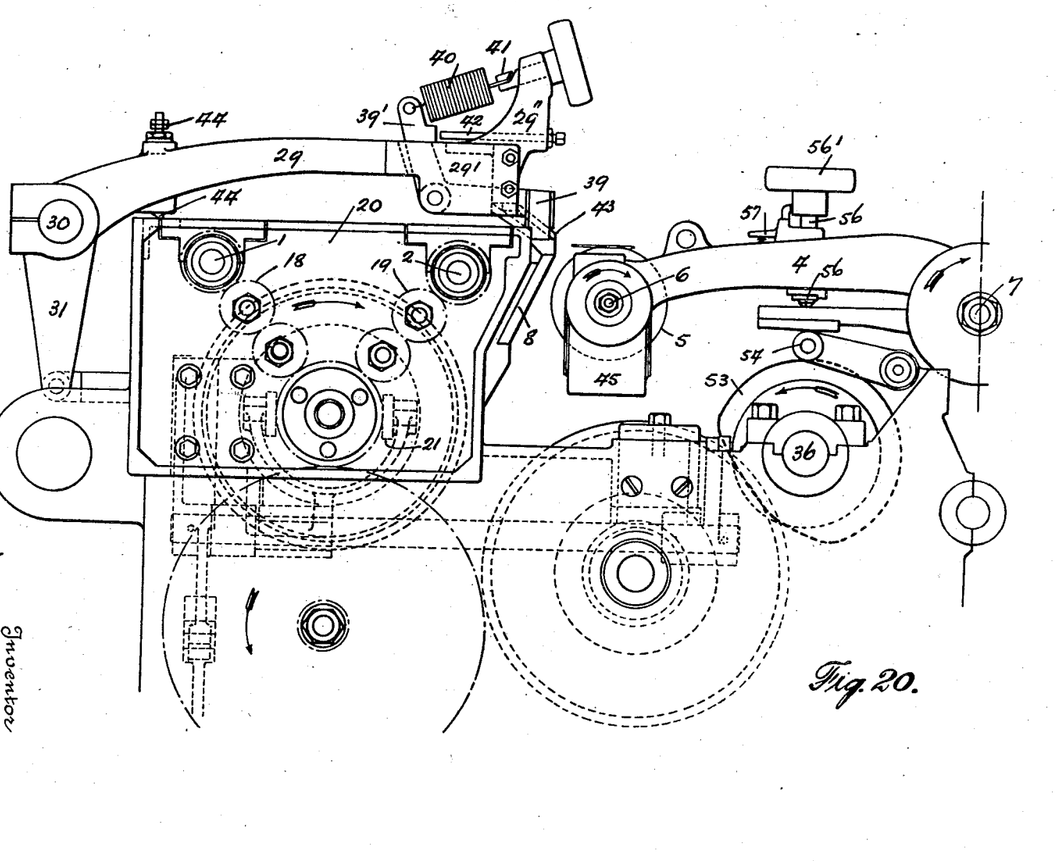
Fig. 20 is a side view of part of the feed end of the machine showing the drive for the conveyor shafts.

The brush-carrying arm 4 is raised and lowered by a cam 53 fixed on the shaft 36 and adapted to bear against a cam follower 54 carried by an adjustable bracket 55 on the shaft 7, see Figs. 18 and 20.

The cam 53 lifts the brush into contact with the needles, see Fig. 20, and lowers it out of contact at the end of a cycle of operation. The pressure of the brush on the needles may be regulated by adjustment of a screw-threaded pin 56 mounted in the arm 4. The pin 56 is furnished with a handwheel 56' and with a spring-influenced detent 57 engageable with serrations on the boss of the handwheel 56', see Fig. 18.

Figure 25:
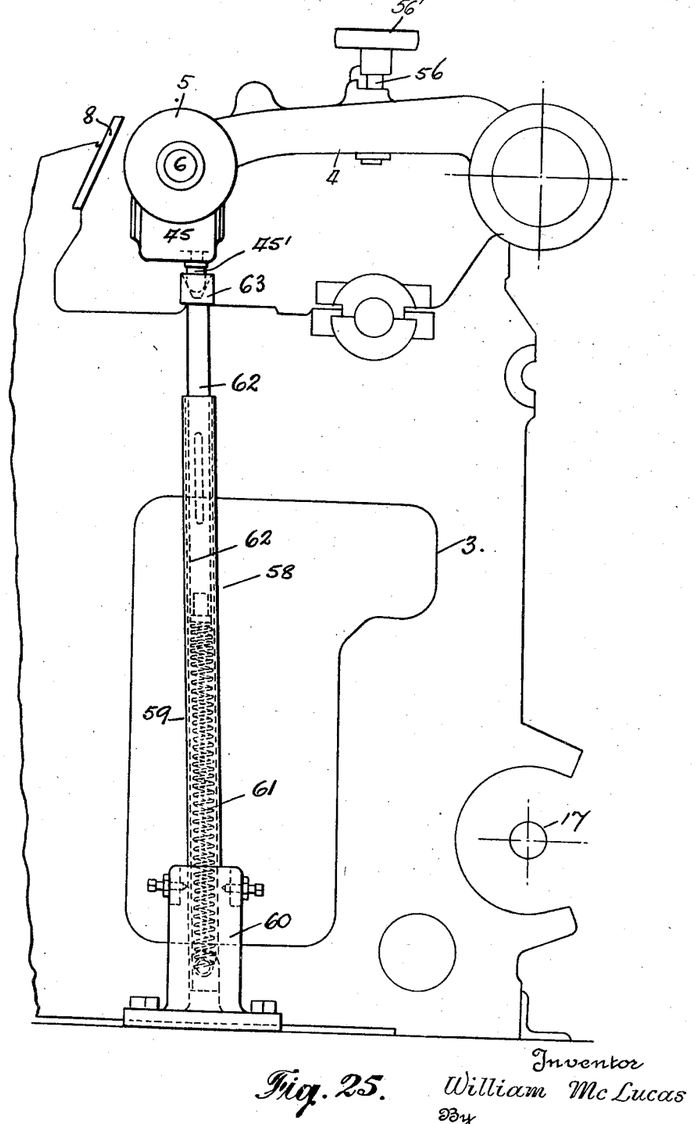
Fig. 25 is a side view of weight-cushioning mechanism for use with the brushing heads of the machine.

To counterbalance the weight of the brush heads and to minimise the load on the cams 53, each brush head is furnished with a weight-cushioning device 58, as shown in Fig. 25. This device comprises a tube 59 supported in a foot-step bearing 60 bolted to the floor. The tube 59 houses a helical compression spring 61 interposed between the bottom of the foot-step 60 and a plunger rod 62 fitting slidably in the tube 59 and furnished at its upper end with a socket 63 adapted to receive and form a bearing for a pin 45' attached to the bottom of the head 45 of the brush arm.

When an operative wishes to apply abrasive or other material to the brush, or for any other purpose, the brush head may be manually lifted about its pivot 7 by means of a handle 64 projecting from the arm 4, see Figs. 18 and 19.

The brush head is given a slight transverse oscillatory movement by means of an eccentric 65 acting on a lever 66 connected to a shaft 67 on which is mounted a bracket 68 carrying the shaft 7 of the brush head, see Figs. 5, 18 and 20. The extent of the transverse oscillation may be adjusted by means of a handwheel 69, Fig. 5.

The upper brush 70 at each of the brush stations F and J is driven by a belt 71 engaging a pulley 72 on the brush axle 73 and a pulley 74 carried by an arm 75 connected by a turnbuckle 76 to a lever 77 carrying the bearing head of the brush 70. Thus, the tension of the belt 71 is maintained as the brush head is oscillated about the shaft 67, see Figs. 15, 16.

The tongs are lifted from the machine at the finish of the brushing operation by lifting mechanism now to be described with reference to Figs. 3, 4, 7, 21, 22, 23 and 24.

Mounted for guided slidable movement in a bracket at the delivery end of the machine is a vertical post 78 carrying a horizontal arm 79 upon which are secured at positions adapted to register with the jaw member of the tongs 22 and with the tail 27 of said tongs, respectively, two automatically operating spring influenced grippers 80, 81 adapted to be pressed over the jaw member and the tail of the tongs when lowered thereon and to grip said jaw and tail.

Figures 21, 22:
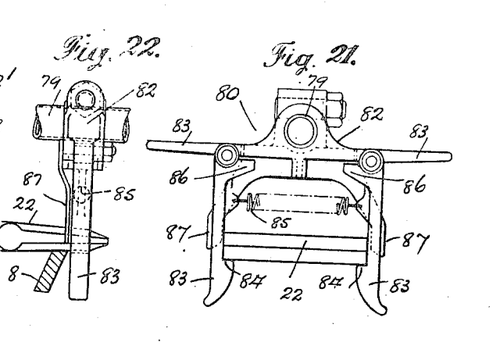

Referring to Figs. 21 and 22, the grippers 80 for gripping the jaw member of the tongs comprise a bracket 82 on which is pivotally mounted a pair of bell-crank levers 83 the lower ends of which are curved and formed with shoulders 84. The levers 83 are inter-connected by a spring 85 whereby they are normally held in the position shown in Fig. 21. Stops 86 are provided to restrict the inward movement of the levers 83. Guide fingers 87 on the bracket 82 are provided to guide the grippers on to the jaw members of the tongs. When, as later to be described, the device is lowered and pressed on to the jaw member of the tongs 22 the levers 83 separate and slip over said jaw member until the action of the spring 85 draws them together again with the shoulders 84 below the jaw member 22, see Fig. 21.

Figures 23, 24:
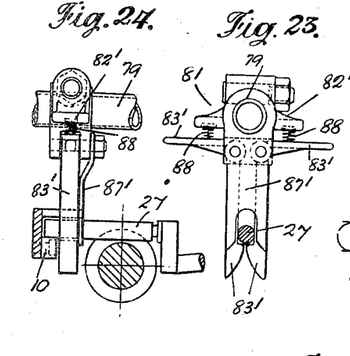

Referring to Figs. 23 and 24, the grippers 81 are of similar but narrower construction, and parts corresponding generally to those in Figs. 21 and 22 are indicated by the same reference numerals with the addition of the exponent "1." In this construction, the levers 83' are influenced by compression springs 88 located between the horizontal arms of the levers and the bracket 82'.

The action of the grippers 81 in gripping the tail 27 of the tongs is similar to the action of the grippers 80.

The lifting mechanism is raised and lowered by means of a lever 89 connected at one end to the post 78 and pivotally mounted adjacent to its other end on the adjacent end frame 3 of the machine. The lever 89 carries on its shorter arm a cam follower 89' engaging a cam 90 whereby as the cam rotates the lever 89 is caused to raise and lower the post 78 and the grippers 80, 81. The grippers 80, 81 are shown in raised position in dotted lines in Fig. 7.

When the grippers have been lowered to seize a pair of tongs and raised to lift the tongs from the machine, the post 78 is turned about its axis through an angle of 90°, so as to bring the tongs 22 into position immediately above the conveyor belt 11. This movement is effected by a lever 91 connected at one end to a cranked arm 91' on the post 78 and at its other end to the upper arm of a lever 92 pivoted to the frame and having at its lower end a cam follower 93 engaging a profile cam 94. As the lever 92 is moved by the action of the cam 94 it imparts turning movement to the post 78. The cams are intermittently rotated through gearing driven by belt and pulleys.

At the completion of the aforesaid turning movement, which is limited by a stop 95 in a bracket 96, the tongs 22 are in the position indicated by dotted lines in Fig. 4. At this point the cam 90 again acts on the lever 89 to lower the gripping mechanism. As the bar 79 is lowered the horizontal arms of the lever 83, 83', respectively, meet against stops 97 on the bracket 96, and stops 98 on a further bracket 99, whereupon the levers 83, 83' are rocked about their respective pivots and the levers of each pair separate and release the tongs, which latter fall on to the conveyor belt 11. The gripper mechanism is then returned to initial position ready to remove the next pair of tongs. A stop 100 serves to limit the movement of the bar 79 in this direction, see Fig. 7.

The operation of the machine will now be described.

Two operatives are stationed at the table 12. A third operative is stationed at the table 13. A fourth operative stationed at the opposite side of the machine has for duty to make the necessary adjustments to the brush heads and to keep the brushes supplied with abrasive material or chalk as may be required.

For convenience in description mention will be made of certain times in the cycle of operations but it is to be understood that these times are purely arbitrary.

Briefly the operation is as follows: The needles to be treated are loaded by operatives one and two into needle-shank-gripping tongs 22 with the blades of the needles projecting from the jaws of the tongs. The tongs are then placed on the conveyor feed screws 1, 2. These screws rotate intermittently and carry the tongs from brushing station to brushing station. After passing through the six successive brushing stations A, B, C, D, E, F, the tongs come to rest at a point adjacent to the table 13.

Operative three stationed at this table lifts the tongs 22 from the machine and transfers the needles to another pair of tongs which grip the blades of the needles and expose the shanks. The empty tongs are conveyed back along the conveyor to operatives one and two at the table 12.

Operative three then places the fresh tongs upon the conveyor screws 1, 2. As the tongs continue to travel along the machine each brush head G, H, I, J brushes the shanks of the needles. When the tongs arrive at the discharge end of the machine the lifting arm 73 is lowered and the grippers 74, 75 grip the tongs. The arm 73 rises, swings, descends, and deposits the tongs on the conveyor belt 11. The belt 11 conveys the tongs, still carrying the needles, back to the operative at table 13. The duty of this operative is to release the treated needles into a container.

The machine is thus designed to brush the blades and the shanks of needles.

It will be understood that each needle may have a long groove in one side of the blade and a short groove in the opposite side.

Operatives one and two arrange the needles in a row on spring metal plates on the table 12, and by tapping said plates, the needles are caused to turn by gravity so that the long grooves are uppermost. A plurality of needles, for example fifty or sixty, according to size, are then gripped in a row in the tongs 22. The points are placed against a block on the table as the needles are locked in the jaws of the tongs by means of the locking ring 28.

The tongs 22 are then laid on the conveyor screws 1, 2 in the position shown by dotted lines at the left hand end of Fig. 4, during a brushing period of the cycle when the screws are stationary.

The jaw members of the tongs 22 rest on the guide plate 8, while the tail 27, passed through the slot 10' of the guide plate 10, rests in said guide 10 so that the tongs lie clear of the roots of the screws 1 and 2, see Fig. 8. The long grooves of the needles should be to the underside when the tongs 22 are placed on the screws 1, 2 to ensure that, with the brush lay-out as previously described, the long grooves receive twice as much copper brushing as the short grooves. The clutch 21 now engages and the screws 1, 2 rotate for several seconds. When the screws again come to rest the tongs 22 have travelled to the first brass brush at station A. The clamp 29 lifts just before the screws 1, 2 rotate, to allow passage of the tongs 22, and then drops again to clamp the tongs 22 in position, as previously described. The side plates 43 on the clamp 29 serve to prevent any side movement of the tongs.

The brushing heads drop just before the screws 1, 2 rotate, to allow passage of the tongs, and then rise to come into contact with the needles, see Fig. 20, as previously described.

The brush 5 in each head is rotating at high speed, for example at 4000 R. P. M., approximately, and moves across the needles and also in parallelism with the needles, as previously described with reference to Figs. 15, 17, 18, 19 and 20.

The latter movement is adjustable to suit needles of different lengths. The brushing period may last for say ten seconds, which added to a travelling time of say three and a half seconds gives a total cycle time of thirteen and a half seconds.

On completion of the brushing period, the clamp 29 is lifted, the brush 5 recedes, and the clutch 21 again engages and the screws 1, 2 again rotate and carry the tongs 22 to the second brass brush at station B. As it is desired to brush the other side of the needle blades, the said second brush is also brass, and the tongs 22 are turned while travelling between the first and second stations in order to present the other side of the blades to the second brush. This is accomplished by means of a break or notch 9 in the bar 8 into which the leading edge of the tong jaw drops, thus rotating the tongs through 90°. A further 90° rotation is obtained when the jaw, now in vertical position, strikes the far side of the gap 9. The tongs 22 therefore come to rest in inverted position at the second brush station B.

Thus, turning movement of the tongs is very simply performed, and is perforated when the tongs 22 are approaching every second station, i. e., when approaching stations B, D, F, H and J.

Rotation of the conveyor screws 1 and 2 tends to cause the tongs 22 to roll. This rolling movement is prevented by the guide plate 8. When, however, the jaw member loses the support of the guide plate 8 and drops into the gap 9, the action of the conveyor screws on the tongs 22 turns said tongs over as described.

Owing to this rotation, it will be appreciated that the tongs must be of symmetrical form.

Figure 9:
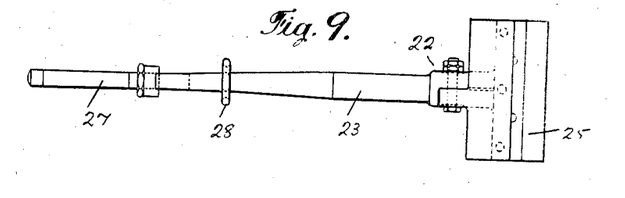
Fig. 9 is a plan of the tongs.

As the jaws of the tongs wear away they can be adjusted by means of the adjustable tail 27, see Figs. 8 and 9.

The operation proceeds in similar manner at each brushing station, tongs being placed on the screws 1, 2 in succession when the screws are at rest.

Figures 15, 16, 17:
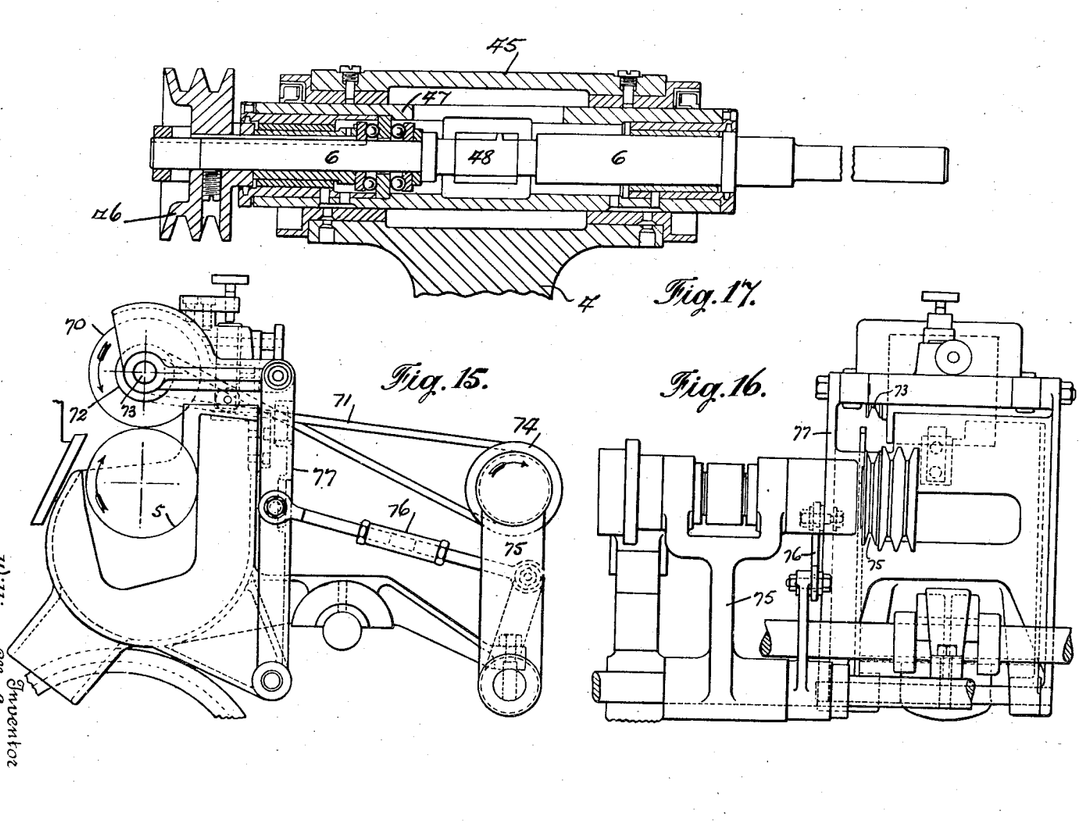
Fig. 15 is a fragmentary side view of driving mechanism for imparting motion to a brush.
Fig. 16 is an end view of Fig. 15.
Fig. 17 is a sectional view drawn to a larger scale of a bearing for a brush shaft.

The tampico or hair brush at station F is surmounted by a secondary brush, see Fig. 15, which removes any chalk deposit on the upper sides of the needles.

When the tongs pass the station F they come to rest and are removed by operative three at table 13. This operative transfers the needles to another tongs to bring the shanks of the needles into operative position, and places the empty tongs on the conveyor belt 11 for return to the table 12. The operative then places the fresh tongs on the conveyor screws 1, 2 when the screws are at rest, in similar manner to that previously described for station A.

The tongs are thus traversed in succession along the conveyor to the several stations G, H, I, J and finally come to rest in turn against a stop at the delivery end of the machine. The tongs are then lifted by the lifting mechanism previously described with reference to Figs. 3, 4, 7, 21, 22, 23 and 24, and dropped on to the conveyor 11, whence they are removed at table 13, and the needles deposited in a container.

The brushing cycle is not of sufficient duration to allow one operative at table 12 time to arrange the needles and load them into the tongs, so that two operatives are necessary at this table. The single operative at table 13, however, has ample time to make the change-over.

It is of utmost importance, owing to the high speed at which they run, that the brushes may be balanced and run truly. To facilitate this operation the sleeve mounting illustrated in Fig. 17 is employed. This enables a brush to be trued and balanced, in a running spindle on the bench, ready for replacement of a worn brush, with the minimum loss of machine running time.

An important factor in the successful operation of the machine is the absolute interchangeability of the tongs; a full complement numbers nineteen, i. e., twelve for blade brushing and seven for shank brushing.

I claim:

1. A semi-automatic machine for use in scouring and polishing the blades and shanks of sewing machine needles, including a pair of rotary conveyor screws adapted to convey needle-carrying members along the length of the machine, mechanism for intermittently rotating said conveyor screws, brushing heads or stations located at spaced points along the length of the machine, at least one rotary brush located at each station, guide rail means disposed alongside the conveyor screws and adapted to support and guide the needle-carrying members, and clamp means located at each station for clamping the needle-carrying members in position during the scouring or polishing operation.

2. A semi-automatic machine as claimed in claim 1 including provision at each brushing station for effecting rotation of the brush and for effecting axial and transverse reciprocation of the brush.

3. A semi-automatic machine as claimed in claim 1 in which each brush is carried by an arm which is adapted to be raised and lowered whereby to move the brush into and out of operative position.

4. A semi-automatic machine as claimed in claim 1 in which the needle-carrying members are constituted as tongs each adapted to hold a plurality of needles arranged side-by-side in a row.

5. A semi-automatic machine as claimed in claim 1 including an oscillatory transfer device located at the delivery end of the machine and adapted to lift the needle-carrying members one at a time from the conveyor screws.

6. A semi-automatic machine as claimed in claim 1 including provision whereby the needle-carrying members are overturned at predetermined stages in their passage through the machine.

7. A semi-automatic machine as claimed in claim 1 including a power-driven endless conveyor belt or the equivalent disposed along the rear of the machine and extending from one end to the other end of the machine, a table arranged at the rear of the machine at the feeding end, and a further table arranged at the rear of the machine at a point intermediate of the feeding and delivery ends of the machine.

8. A semi-automatic machine as claimed in claim 1 in which the machine is divided into two sections, one section for treating the blades of the needles and the other section for treating the shanks of the needles.

WILLIAM McLUCAS.